United States Patent
Lyhr

(10) Patent No.: US 9,653,096 B1
(45) Date of Patent: May 16, 2017

(54) COMPUTER-IMPLEMENTED METHOD PERFORMED BY AN ELECTRONIC DATA PROCESSING APPARATUS TO IMPLEMENT A QUALITY SUGGESTION ENGINE AND DATA PROCESSING APPARATUS FOR THE SAME

(71) Applicant: FirstAgenda A/S, Åbyhøj (DK)

(72) Inventor: Kasper Lyhr, Højbjerg (DK)

(73) Assignee: FirstAgenda A/S, Åbyhøj (DK)

( * ) Notice: Subject to any disclaimer, the term of this patent is extended or adjusted under 35 U.S.C. 154(b) by 0 days.

(21) Appl. No.: 15/132,977

(22) Filed: Apr. 19, 2016

(51) Int. Cl.
| | | |
|---|---|---|
| G10L 19/00 | (2013.01) | |
| G10L 21/00 | (2013.01) | |
| G10L 25/00 | (2013.01) | |
| G10L 25/60 | (2013.01) | |
| G10L 17/02 | (2013.01) | |
| G10L 17/22 | (2013.01) | |
| G06F 3/16 | (2006.01) | |
| G10L 15/26 | (2006.01) | |
| G10L 15/08 | (2006.01) | |

(52) U.S. Cl.
CPC .............. *G10L 25/60* (2013.01); *G06F 3/162* (2013.01); *G10L 15/26* (2013.01); *G10L 17/02* (2013.01); *G10L 17/22* (2013.01); *G10L 2015/088* (2013.01)

(58) Field of Classification Search
USPC .......................... 704/231, 235, 246, 270–275
See application file for complete search history.

(56) References Cited

U.S. PATENT DOCUMENTS

| | | | | |
|---|---|---|---|---|
| 7,483,618 B1 * | 1/2009 | Edwards | .............. | G11B 27/034 386/248 |
| 7,624,008 B2 * | 11/2009 | Beerends | ................ | G10L 25/69 704/224 |
| 8,856,115 B1 | 10/2014 | Huffman et al. | | |
| 2005/0015253 A1 * | 1/2005 | Rambo | ............... | H04M 3/2236 704/246 |
| 2007/0033030 A1 * | 2/2007 | Gottesman | .......... | H04M 1/6025 704/233 |
| 2007/0112563 A1 * | 5/2007 | Krantz | .................... | G10L 25/69 704/216 |
| 2008/0314228 A1 * | 12/2008 | Dreyfuss | ................ | G09B 15/00 84/477 R |
| 2009/0259475 A1 * | 10/2009 | Yamagami | .............. | G10L 13/10 704/276 |
| 2010/0250257 A1 * | 9/2010 | Hirose | .................. | G10L 13/033 704/278 |
| 2010/0299131 A1 * | 11/2010 | Lanham | .................. | G10L 15/10 704/2 |

(Continued)

*Primary Examiner* — Olujimi Adesanya
(74) *Attorney, Agent, or Firm* — Nixon Peabody LLP

(57) ABSTRACT

A computer-implemented method performed by an electronic data processing apparatus to implement a suggestion engine, comprising: configuring a variable, which is independent from an attribute associated with content of a digital audio recording featuring one or more human voices, by: defining a quality score impact function characterizing a plurality of weight values having a maximum in a central band and tapering away in one or two respective bands adjacent to the central band maximum to produce a range of weight values, and defining a scale setting a minimum and a maximum range of values for the variable corresponding to the range of weight values.

13 Claims, 11 Drawing Sheets

(56) References Cited

U.S. PATENT DOCUMENTS

| | | | |
|---|---|---|---|
| 2011/0246189 A1* | 10/2011 | Fox | G06F 3/165 704/210 |
| 2011/0246192 A1* | 10/2011 | Homma | G10L 25/69 704/228 |
| 2014/0153902 A1* | 6/2014 | Pearson | G06F 17/30 386/241 |

* cited by examiner

400

| Conf. | A | QSI_f(v) | SUG(A,n) |
|---|---|---|---|
| Conf.1 | A_1 | QSI_F1(v) | SUG.A_1(3) |
|  | A_2 | QSI_F2(v) | SUG.A_2(4) |
|  | A_3 | QSI_F3(v) | SUG.A_3(2) |
|  | A_4 | QSI_F4(v) | SUG.A_4(3) |
|  | ⋮ | ⋮ | ⋮ |
| Conf.2 | A_1 | QSI_F1(v) | SUG.A_1(3) |
| ⋮ | A_5 | QSI_F5(v) | SUG.A_5(3) |
|  | A_7 | QSI_F7(v) | SUG.A_7(6) |
|  | A_9 | QSI_F9(v) | SUG.A_9(3) |
|  | ⋮ | ⋮ | ⋮ |

800

COMPUTER-IMPLEMENTED METHOD PERFORMED BY AN ELECTRONIC DATA PROCESSING APPARATUS TO IMPLEMENT A QUALITY SUGGESTION ENGINE AND DATA PROCESSING APPARATUS FOR THE SAME

FIELD OF THE INVENTION

The present invention relates generally to digital audio processing and more particularly to a computer-implemented method performed by an electronic data processing apparatus to implement a quality suggestion engine for one or more digital audio recording featuring one or more human voices. Additionally, the present invention relates to an electronic data processing apparatus implementing the quality suggestion method.

BACKGROUND OF THE INVENTION

Determining a quality of content of a digital audio recording featuring multiple human voices is not straightforward, especially not for attributes that are not inherent for the digital audio recording, i.e. attributes that are not measurable or directly obtainable by processing the digital audio recording.

Therefore it is furthermore not simple to track the quality of content over time for successively obtained digital audio recordings.

It is useful to be able to be automatically provided with one or more suggestions that would increase, if applied, the quality of content of future or subsequent digital audio recordings.

There is therefore a need for a consistent quality suggestion engine for digital audio recordings.

It would also be a benefit to have a simple way to search among content of one or more digital audio recordings.

SUMMARY OF INVENTION

In an aspect, a quality of the content of a digital audio recording featuring multiple human voices is improved by adjusting an "external" attribute, which is independent from any attribute of the digital audio recording itself, according to a quality score impact function characterized by a maximum that tapers away on one or both sides. According to the function, attribute values at or near the maximum are deemed to have a positive impact on the overall quality score, whereas attribute values distal from the maximum in one or either direction are deemed to have a negative impact or at least less positive impact on the overall quality score. In this respect, the impact on the quality score is not ever-increasing or proportional to the attribute value. Just because the attribute value may increase, the impact on the quality score can actually diminish and become counter-productive. In this example only, the attribute is independent from any attribute, parameter, or characteristic of the recording itself. What this means, for example, is that external factors (hence, "external" attribute) can have an impact on the quality of the content of the recording. It should be emphasized that aspects of the present disclosure relate to improving the quality of the content itself, not to improving the digital audio recording. Rather, it is the actual content or information embodied in the human utterances in the recording that can be qualitatively improved according to aspects of this disclosure. An illustrative example of an external attribute is the amount of time spent on preparing for the audio recording. Other examples of external attributes include: (1) the number of time zones of the human participants in the audio recording; (2) the geographical diversity of the physical locations of the human participants in the audio recording; (3) the number of documents presented during the audio recording; (4) an amount of research in time units spent preparing for the audio recording; (5) the number of preparers of the audio recording; (6) the types or characteristics of recording devices used to record each human participant in the audio recording; (7) a quantity of electronic correspondence among the human participants in preparation for the audio recording; (8) a quantity of scheduling conflicts and rescheduling requests in connection with establishing a time to initiate the audio recording. The audio recording itself has a duration, but the duration of the audio recording is considered to be an "internal" attribute because it characterizes an attribute or parameter of the recording itself, i.e., its duration. However, the time spent preparing for the audio recording does not describe or characterize any attribute or parameter of the recording itself. In this sense, it is an "external" attribute. A surprising discovery is that such external attributes can actually have an impact (positive, negative, or neutral) on the quality of the content of audio recordings, and the present disclosure exploits these perspectives. Relatedly, combining one or more external attributes and one or more internal attributes and determining their collective and/or respective impact on content quality can produce even more optimal improvements on the quality of audio recordings.

Furthermore, it has been found that characterizing the above-described quality score impact function having a maximum or maxima band or "plateau" of attribute values surrounded on one or both sides by a linear or non-linear piece-wise or continuous function that tapers away from (never exceeds) the maximum can produce an optimal improvement to the quality of the content of subsequent digital audio recordings if the external attribute in question is adjusted accordingly (e.g., favorably or unfavorably, depending on the adjusted quality score). By improving the quality of the content of subsequent digital audio recordings, which also feature a multitude of human voices, the size of the recordings can be reduced, resulting in smaller storage requirements and/or audio encoding/decoding bandwidth, and lower network bandwidth consumption when communicated (e.g., by streaming) across a computer network. The sound recordings can be encrypted, so smaller files yield faster encryption and decryption times.

The impact on the quality score can be further refined by taking into account an attribute that is actually describing or characterizing an attribute or parameter of the content of the digital audio recording itself, in conjunction with the "external" attribute described above. These types of attributes can be referred to as "internal" or "inherent" attributes associated with the digital audio recording, because they characterize or describe some attribute or parameter of the digital audio recording itself or its content. Examples of internal attributes include a duration of the recording, the number of human voices in the recording, a tone or mood of the voices featured in the recording, predetermined words or phrases spoken in the recording, a number or duration of pauses in the recording where no human voice is recorded, a number or duration of talk-over occurrences in which multiple human voices are recorded speaking simultaneously or over one another in the recording, or a type or role of each human associated with the one or more human voices featured in the recording, to name a few. Further examples of internal attributes include a mood or feeling or emotive value of the content, such as whether the content is generally positive having words or phrases that are generally reassuring, appraising, or supportive, or generally negative having words or phrases that are generally aggressive, hostile, or angry. Certain words or utterances can be categorized onto a positive list (so-called whitelist) or a negative list. All attributes, whether of the internal or external type, are quantified to one or more discrete values along a scale or spectrum or according to a function, and then provided to a quality score impact function that produces a corresponding impact on the quality score metric. Each quality score impact function has the general tapering characteristics described above, although the functions themselves can differ as disclosed herein (e.g., the shape of the tapers can be different, the maximum can shift along the x-axis, the size of the bands or ranges of the tapers can be different, and the impact on the quality score (y-axis) can be shifted upwards or downwards). In some aspects, internal and external attributes can be combined, quantified, provided to different quality score impact functions, and an impact on a quality score can be calculated from the different quality score impact values from the different quality score impact functions to improve a quality of a content of a future or subsequent digital audio recording featuring multiple human voices.

People speaking to one another results in a dynamic that is different from, e.g., music recordings or other audible recordings that do not feature spoken human voices. Spoken utterances convey meaningful content, and the quality of that content can be influenced by external factors. The inventors have experimented and discovered that improvements to the spoken content in a digital audio recording do not necessarily follow a proportional or linear trend. There can be reached a point of diminishing returns, beyond which further adjustment in an external parameter can actually degrade the content further. Too little adjustment to an attribute(s) also does not necessarily produce improvements in the quality of the content. Different attributes can or should be adjusted uniquely (though not necessarily) as they can have different impacts on the quality score. In some aspects, each attribute, whether internal or external, can be associated with a distinct quality score impact function characterizing a distinct impact on an overall quality score for the content of the digital audio recording.

It is an object to alleviate at least one or more of the above mentioned drawbacks at least to an extent.

Furthermore, it is an object to provide a quality suggestion engine for digital audio recordings.

An aspect of the invention is defined in claim 1.

Accordingly, in one aspect of the present invention is provided a computer-implemented method performed by an electronic data processing apparatus to implement a suggestion engine. The computer-implemented method comprises configuring a variable, which is independent from an attribute associated with content of a digital audio recording featuring one or more human voices, by defining a quality score impact function characterizing a plurality of weight values having a maximum and tapering away in one or two respective bands adjacent to the maximum to produce a range of weight values, and defining a scale setting a minimum and a maximum range of values for the variable corresponding to the range of weight values. The computer-implemented method further comprises calculating an impact on a quality score of one of the values for the variable according to the quality score impact function to produce an impact value adjusting the quality score based on the calculated impact value to cause a qualitative improvement in a content of a further digital audio recording, wherein the weight values in the one or two respective bands have a negative impact on the quality score, whereas weight values outside the respective bands have a positive impact on the quality score. The computer-implemented method additionally comprises causing a representation of the adjusted quality score to be displayed on an electronic display of a client device. The attribute associated with the content of the digital audio recording includes a duration of the recording, a tone or mood of one or more of the one or more human voices featured in the recording, one or more predetermined words or phrases uttered by one or more of the one or more human voices featured in the recording, a number or duration of pauses in the recording where no human voice is speaking, a number or duration of talk-over occurrences in which multiple ones of the one or more human voices are speaking simultaneously in the recording, a number of human voices featured in the recording, or a type or role of each human associated with the one or more human voices featured in the recording. The variable includes an amount of time associated with preparing the recording independent of a duration of the recording. The quality score impact function includes a linear function segment to characterize at least part of one of the bands that tapers away from the maximum. The quality score impact function includes a non-linear function segment to characterize at least part of one of the bands that tapers away from the maximum. The computer-implemented method comprises applying a weight or a weight function to the calculated impact value, wherein the weight function defines different weights for different impact values. The computer-implemented method comprises configuring a second variable, which is related to an attribute associated with the content of the digital audio recording by: defining a second quality score impact function characterizing a second plurality of weight values having a maximum and tapering away in one or two respective bands adjacent to the maximum to produce a second range of weight values, and defining a second scale setting a minimum and a maximum range of values for the second variable corresponding to the range of weight values; calculating an impact on the quality score of one of the values for the second variable according to the second quality score impact function to produce a second impact value; adjusting the quality score based on the calculated second impact value to cause a further qualitative improvement in the content of a further digital audio recording, wherein the weight values in the one or two respective bands have a negative impact on the quality score, whereas weight values outside the one or two respective bands have a positive impact on the quality score, wherein the quality score impact function is different from the second quality score impact function, and wherein the scale and the second scale have different minima and maxima. The computer-implemented method comprises causing an adjustment to the attribute associated with content of a further digital audio recording according to an extent indicated by the adjusted quality score; storing the further digital audio recording, wherein the further digital audio recording has a smaller file size compared to the digital audio recording, and wherein the further digital audio recording produces a higher quality score compared to the adjusted quality score. The computer-implemented method comprises determining from the adjusted quality score a suggestion for adjusting the attribute to produce a qualitative improvement in the content of the further digital audio recording; and causing the suggestion to be displayed on the electronic display of the client device. The suggestion is based on the calculated impact value such that responsive to the calculated impact value having a negative impact on the quality score, the suggestion indicates an enhancement to the attribute to produce an increase in the quality score in the further digital audio recording. The computer-implemented method comprises receiving an input from an electronic human-machine interface device indicating an adjustment to the attribute associated with content of the further digital audio recording according to the suggestion; and storing the further digital audio recording, wherein the further digital audio recording has a higher quality score compared to the adjusted quality score associated with the digital audio recording. The computer-implemented method comprises automatically transcribing the content of the digital audio recording into corresponding machine-and-human-readable text. The computer-implemented method comprises configuring a second variable that includes an attribute associated with the content of the digital audio recording; defining a second quality score impact function characterizing a plurality of weight values having a maximum and tapering away in one or two respective bands adjacent to the maximum to produce a range of second weight values; defining a second scale setting a minimum and a maximum of values for the second variable corresponding to the range of second weight values; calculating an impact on a quality score of one of the values for the second variable according to the second quality score impact function to produce a second impact value; and adjusting the quality score based on the calculated second impact value to cause a further qualitative improvement in the content of the further digital audio recording. The attribute associated with the content of the digital audio recording includes a duration of the recording, a tone or mood of one or more of the one or more human voices featured in the recording, one or more predetermined words or phrases uttered by one or more of the one or more human voices featured in the recording, a number or duration of pauses in the recording where no human voice is speaking, a number or duration of talk-over occurrences in which multiple ones of the one or more human voices are speaking simultaneously in the recording, a number of human voices featured in the recording, or a type or role of each human associated with the one or more human voices featured in the recording. The maximum of the weight values is a plurality of maxima in the range of weight values.

DEFINITIONS

All headings and sub-headings are used herein for convenience only and should not be constructed as limiting the invention in any way.

The use of any and all examples, or exemplary language provided herein, is intended merely to better illuminate the invention and does not pose a limitation on the scope of the invention unless otherwise claimed. No language in the specification should be construed as indicating any non-claimed element as essential to the practice of the invention.

This invention includes all modifications and equivalents of the subject matter recited in the claims appended hereto as permitted by applicable law.

BRIEF DESCRIPTION OF THE DRAWINGS

FIG. 4a schematically illustrates an alternative (or modified) quality score impact function of the quality score impact function of FIG. 3a while

FIG. 4c schematically illustrates another alternative quality score impact function of the quality score impact function of FIG. 3a;

FIG. 4d schematically illustrates yet another alternative quality score impact function of the quality score impact function of FIG. 3a;

DETAILED DESCRIPTION OF THE INVENTION

Various aspects and embodiments of a computer-implemented method performed by an electronic data processing apparatus to implement a suggestion engine as disclosed herein will now be described with reference to the figures.

When relative expressions such as "upper" and "lower", "right" and "left", "horizontal" and "vertical", "clockwise" and "counter clockwise" or similar are used in the following terms, these refer to the appended figures and not necessarily to an actual situation of use. The shown figures are schematic representations for which reason the configuration of the different structures as well as their relative dimensions are intended to serve illustrative purposes only.

Some of the different components are only disclosed in relation to a single embodiment of the invention, but is meant to be included in the other embodiments without further explanation.

Figure 1:
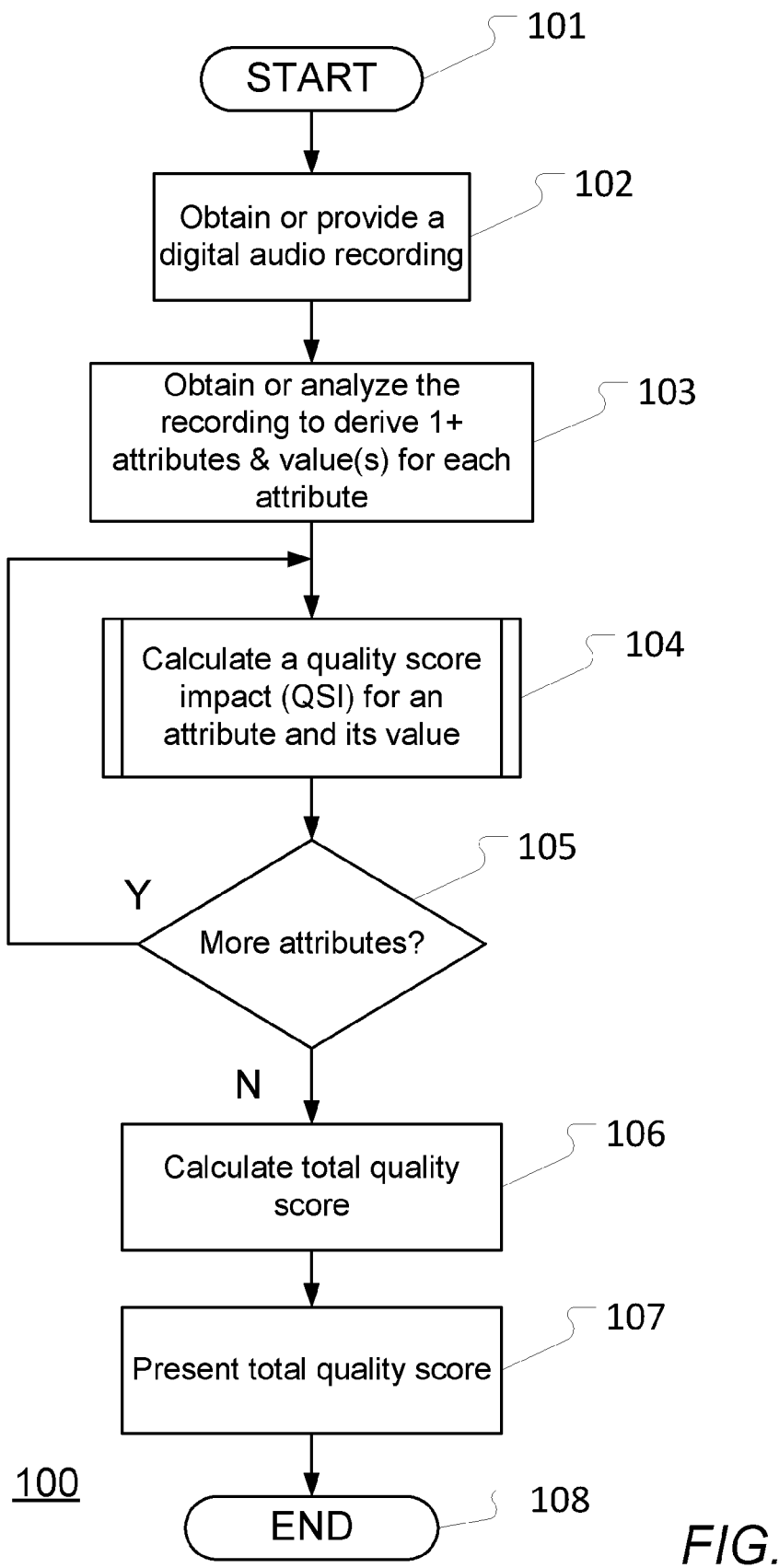
FIG. 1 schematically illustrates a flow chart of an embodiment of a method of calculating a total quality score for a digital audio recording.

FIG. 1 schematically illustrates a flow chart of an embodiment of a method of calculating a total quality score for a digital audio recording.

Figures 8, 10:
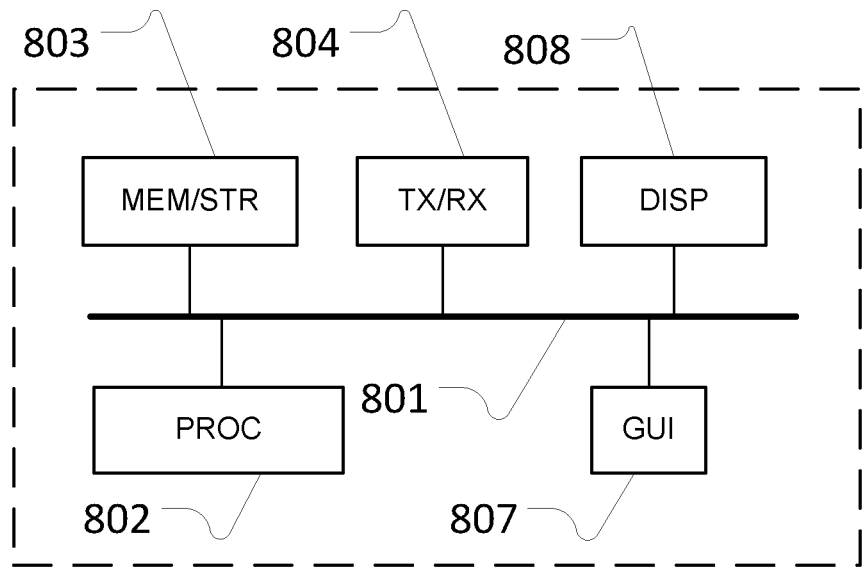
FIG. 8 schematically illustrates a functional block diagram of embodiments of an electronic data processing apparatus comprising a quality suggestion engine and/or implementing various embodiments of the methods mentioned throughout the specification.
FIG. 10 schematically illustrates an embodiment of a data structure.

Shown in FIG. 1 is a flowchart of an embodiment of a computer-implemented method 100 of calculating a total (or combined) quality score metric (forth only referred to as quality score) for a digital audio recording where the computer-implemented method is performed by an electronic data processing apparatus, e.g. or preferably such as the one illustrated in FIG. 8.

At step 101, the method starts and potentially is initialized, etc.

At step 102, a digital audio recording featuring one or more human voices is provided or obtained. It may e.g. be obtained by a separate client device providing the digital audio recording or any suitable representation thereof to the electronic data processing apparatus implementing the quality score calculation method 100. Optionally, the digital audio recording can be manually or electronically transcribed into corresponding machine-and-human-readable text using any conventional audio transcription or speech-to-text technique or software application. Such a transcribed version or representation of the digital audio recording readily provides a searchable digital audio recording by using the transcribed version or representation as opposed to searching a digital audio file for audio one or more particular audio segments, which is a much more complex operation computationally.

Additionally, it may also be computationally more efficient, i.e. utilizing minimal or less microprocessor bandwidth, using the transcribed version or representation of the digital audio recording for processing, calculations, etc. purposes, e.g. to determine one or more associated values (equally denoted attribute values or quality values throughout) for a one or more attributes as described further in the following. The digital memory capacity required to store a given transcribed version or representation of a digital audio file is generally also less than the digital memory capacity required to store the digital audio file so using the transcribed version or representation will reduce the memory usage of the electronic data processing apparatus.

A transcribed version or representation may e.g. also be trimmed (e.g. by removing uninteresting words) reducing the digital storage requirements further.

In some embodiments, the digital audio recording may be provided by merging or otherwise combining two or more digital audio recordings (recorded the same time or overlapping in time) into one to increase the content quality of the audio recording. The merging or combining may e.g. be done on the basis of the digital audio recordings or on representations thereof (e.g. merging or combining the transcribed version or representation of the digital audio recordings). At step 103, one or more (internal or external) attributes and at least one associated value for each attribute of the digital audio recording is provided e.g. from the client device also providing the recording itself or alternatively from another suitable source such as another electronic data processing apparatus, system, etc.

Alternatively, the one or more attributes and/or the at least one value for each attribute is not provided but obtained by the electronic data processing apparatus analyzing the digital audio recording to generate these.

A given digital audio recording may be associated with or designated to a given predetermined context, configuration, group, or similar, whereby similar digital audio recordings then may be seen as belonging within the same context, configuration, group, or similar (forth only referred to by configuration).

An attribute for a digital audio recording is a parameter or the like with at least one associated value that has relevance and/or (statistical) significance directly or indirectly for the quality of the digital audio recording; at least within the given predetermined configuration. The attribute may be "external" or "internal" or "inherent", as mentioned earlier.

In some embodiments, the number of attributes for digital audio recordings belonging to the same configuration, etc. may e.g. be about 10 or 20, but the actual number will typically depend on the digital audio recordings, the configuration, the use, and potentially other factors.

The at least one value of an attribute is/are obtained or derived directly from or on the basis of the actual digital audio recording and/or a suitable representation thereof.

At least some attributes may and typically will be different for digital audio recordings within different configurations. Additionally, at least some attributes may and typically will be the same (but perhaps, but not necessarily, with different possible values or range or band of possible values) for digital audio recordings within different configurations.

Once the appropriate attribute(s) and value(s) are available, the method proceeds to step 104.

At step 104, an (audio) quality score impact (QSI) for one attribute is automatically calculated taking into account the associated value(s) for that particular attribute.

According to an aspect, the QSI is calculated for the attribute using at least one quality score impact function, e.g. such as the ones shown in FIGS. 3 and 4 or alternative ones.

Figure 2:
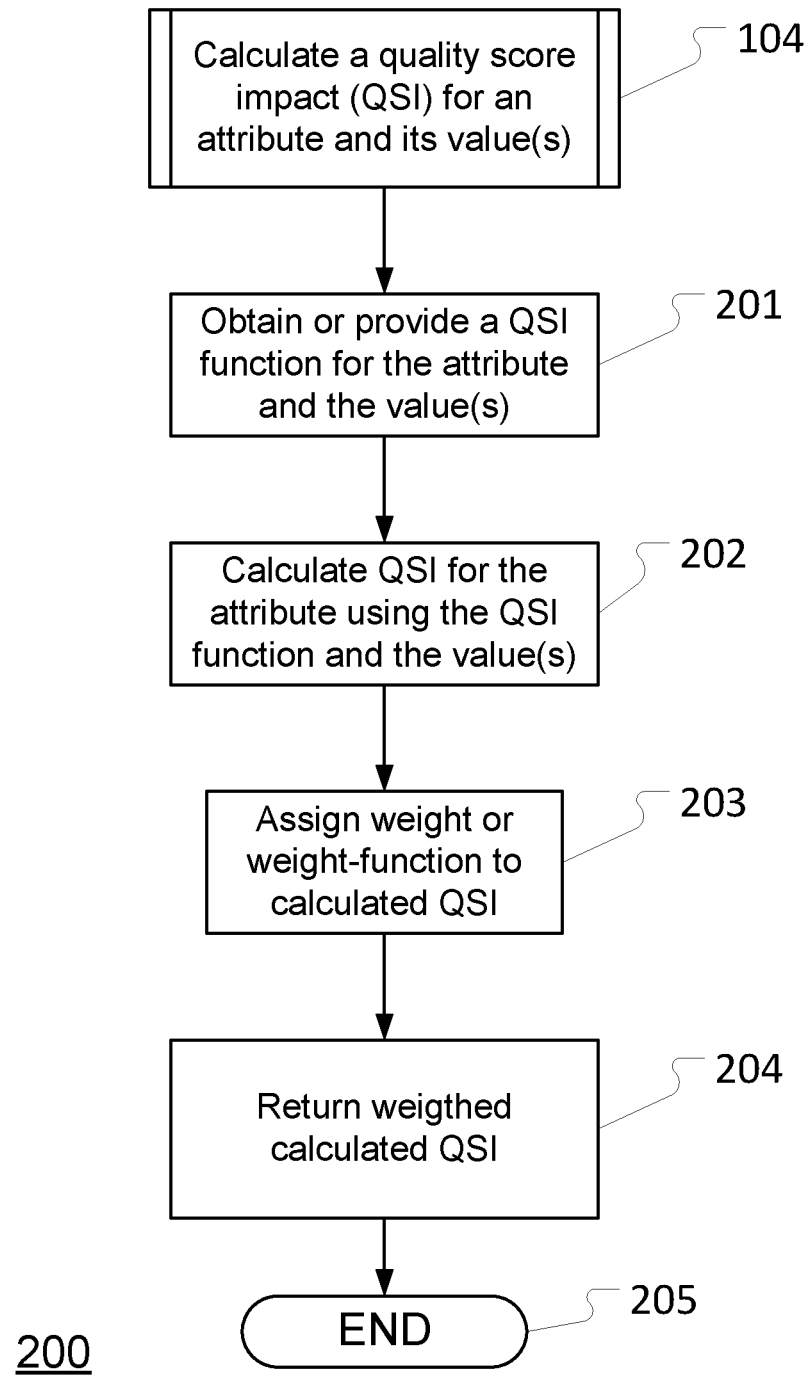
FIG. 2 schematically illustrates a flow chart of an embodiment of a computer-implemented method of automatically calculating a quality score for one attribute and one or more associated values of a digital audio recording that may be used e.g. in the flow chart of FIG. 1.

One embodiment of a (sub-)method of automatically calculating a quality score for a given attribute and its value(s) are shown and explained in further details in connection with FIG. 2.

The QSI is an indicator of to what extent the quality of the digital audio recording is influenced by a given attribute at a given value (where the given value is obtained directly from or on the basis of specific the digital audio recording).

At step 105 it is checked whether a QSI should be generated for additional attributes. If yes, the method loops back to execute step 104 again for the next attribute. If no, the method continues to step 106 where a total quality score is automatically calculated for the digital audio recording given the actual values of the relevant attributes of the digital audio recording.

In some embodiments, the total quality score is provided in a computationally efficient way utilizing minimal microprocessor bandwidth by automatically calculating it by summing the calculated QSIs for the relevant attributes.

In this way, a very useful quality metric is provided for a digital audio recording using the actual content (via the values) of the digital audio recording.

This e.g. enables the provision of a qualitative score of content of a digital audio recording.

Furthermore, and as will be explained further in connection with FIG. 5, it according to another aspect enables the provision of suggestions to improve the quality the content of subsequent digital audio recordings preferably or e.g. within the same configuration. As the quality of subsequent digital audio recordings improve, the duration of subsequent digital audio recordings can potentially be reduced, thereby saving digital storage space occupied by the smaller electronic files. Smaller files produce improvements in digital audio processing and other electronic data manipulation, archival, communication, or retrieval steps.

Additionally, and as will be explained further in connection with FIG. 7, it enables tracking or measuring content quality over time for subsequent digital audio recordings.

At (optional) step 107, the calculated quality score is presented e.g. at one or more client devices and e.g. together with additional relevant information, e.g. together with historical quality scores (such as in FIG. 7) so a development or trending of quality can be tracked.

It is to be noted that several steps can be done in parallel, e.g. step 104 can derive the QSIs for all relevant attributes whereby there is no need for step 105 looping back.

A number of calculated quality scores for digital audio recordings belonging to a same configuration or belonging to related configurations may e.g. be aggregated.

FIG. 2 schematically illustrates a computer-implemented flow chart of an embodiment of a method of automatically calculating a quality score for one attribute and one or more associated values of a digital audio recording that may be used e.g. in the flow chart of FIG. 1.

As mentioned, FIG. 2 illustrates an example implementation of step 104 of FIG. 1, i.e. a method of automatically calculating a QSI 200 that receives an attribute and at least one associated value as explained earlier.

At step 201, an appropriate QSI function for the received attribute and value(s) is obtained or provided. The QSI function may e.g. be stored locally or remotely in one or more electronic databases and/or other electronic storage structure (see e.g. 803, 500 in FIGS. 8 and 9) and may be retrieved therefrom.

Alternatively, the appropriate QSI function is generated by the electronic data processing apparatus using representative parameters. For example, the QSI function of FIG. 3a (and other QSI functions with piece-wise linear segments) can, as mentioned later, be fully represented by only four values or parameters MIN, MAX, MAX_QSI, and OPT_VAL.

The QSI function may, as examples, correspond to any one shown in FIGS. 3a-3d illustrating four exemplary QSI functions for four attributes A_1, A_2, A_3, and A_4, respectively, to any one shown in FIGS. 4a-4f, or any other suitable QSI function. These are QSI functions using only a single value.

At step 202, the relevant QSI function is used together with the supplied value(s) to derive or calculate a QSI score for the value(s).

Figure 3A:
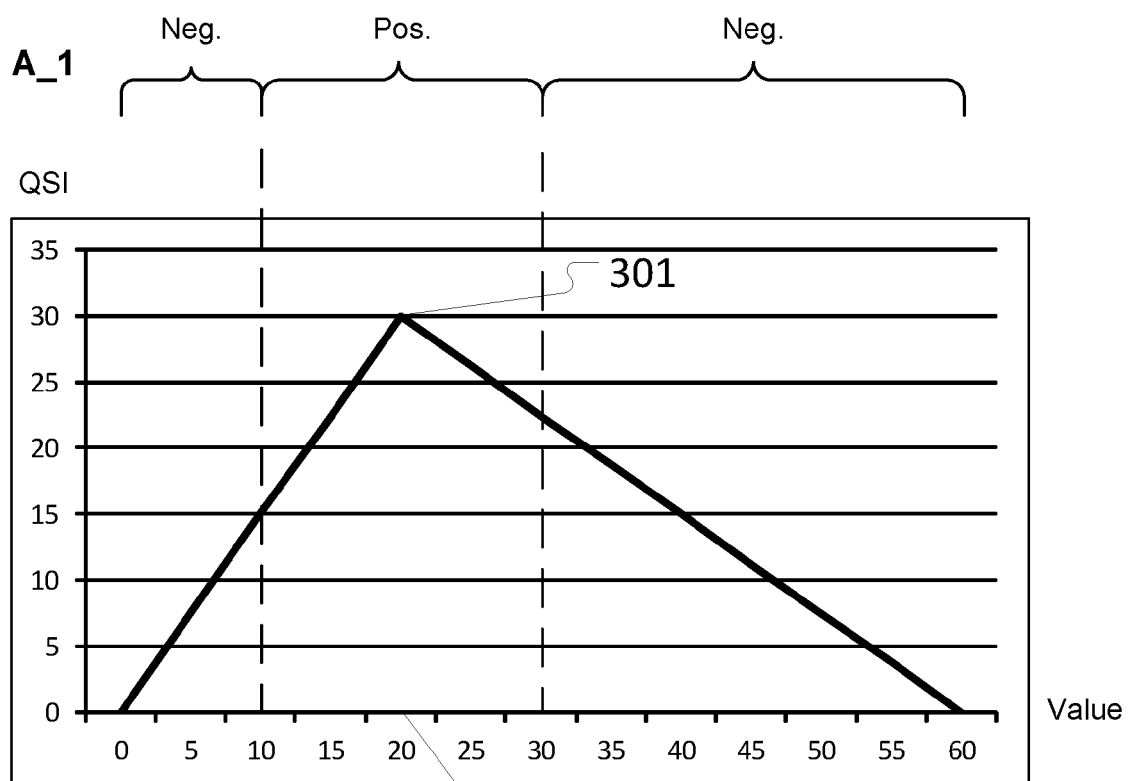
FIGS. 3a-3d schematically illustrate exemplary quality score impact functions for four different attributes of a digital audio recording.

As examples using the QSI function of FIG. 3a, if the value is 10 the QSI function returns a QSI of 15, if the value is 55 the QSI is 5, if the value is 20 the QSI is 30, and so on.

As can be seen from the QSI function of FIG. 3a, it has a maximum QSI score (MAX_QSI; 301) of 30 and a value of 20 can then be designated as the optimal value (OPT_VAL; 302) (for the particular attribute A_1), which signifies that if the attribute (A_1) has a value of 20 (in this particular example) in or based on the digital audio recording, a maximum quality impact or contribution is made to the overall quality score for digital audio recording for the particular attribute (A_1). Or put in another way, in relation to having the best quality of the digital audio recording in relation to the particular attribute (A_1), the value of the attribute should be 20.

Once the QSI score has been obtained or derived, a weight or weight-function is assigned to the QSI score at step 203.

This is advantageous, since it enables assigning a different weight to different QSI scores (or QSI functions) for different attributes and thus assigning a different weight to the quality impact of the different attributes. This can readily accommodate for the situation that not all attributes are as important to the overall quality score of a digital audio recording as others, which make the quality score more representative and/or reliable.

It should be noted, that the weight or weight-function may be applied, as actually is the case in FIGS. 3a-3d, to the QSI function as a whole. E.g. if attribute A_1 is to have a weight of 30%, the non-weighted QSI function is simply scaled by 30%. Instead of working with percentages, a weight of e.g. 30 (out of a total e.g. of 100, where the remaining 70 weight points are distributed among the QSI functions of the other attributes) could be applied to the non-weighted QSI function. The result would be the same. Combining the weight or weight-function into the QSI function avoids the need for step 203 fully. A weight function can enable different weights to be applied for different values.

At step 204, the weighted and calculated QSI is returned to the calling method.

FIGS. 3a-3d schematically illustrate exemplary quality score impact functions for four different attributes of a digital audio recording.

Shown in FIG. 3a is an exemplary QSI function 300 for a given attribute (A_1) having a maximum QSI score (MAX_QSI) 301 that is obtained for an optimal value (OPT_VAL) 302. The QSI further has a minimum (MIN) and maximum (MAX) value for 'value' (i.e. the x-axis). In this particular example, MAX_QSI is 30, OPT_VAL is 20, MIN is 0 and MAX is 60, where MIN and MAX defines a scale along the x-axis.

This particular QSI function 300 has been weighted (with an example weight of 30).

This particular QSI function (and the others in FIGS. 3b-3c) comprises piece-wise linear segments with oppositely signed inclinations in respective ranges or bands on either side of the maximum QSI score. Alternatively, a QSI function could be non-linear (see e.g. FIG. 4f) but for many uses, a (piece-wise) linear function is sufficient.

A further advantage of such linear QSI functions is that their representation can be very compact thereby reducing electronic memory storage. The QSI function of FIG. 3a (and those of the other figures) can be fully represented by only the four values or parameters MIN, MAX, MAX_QSI, and OPT_VAL.

Figure 3B:
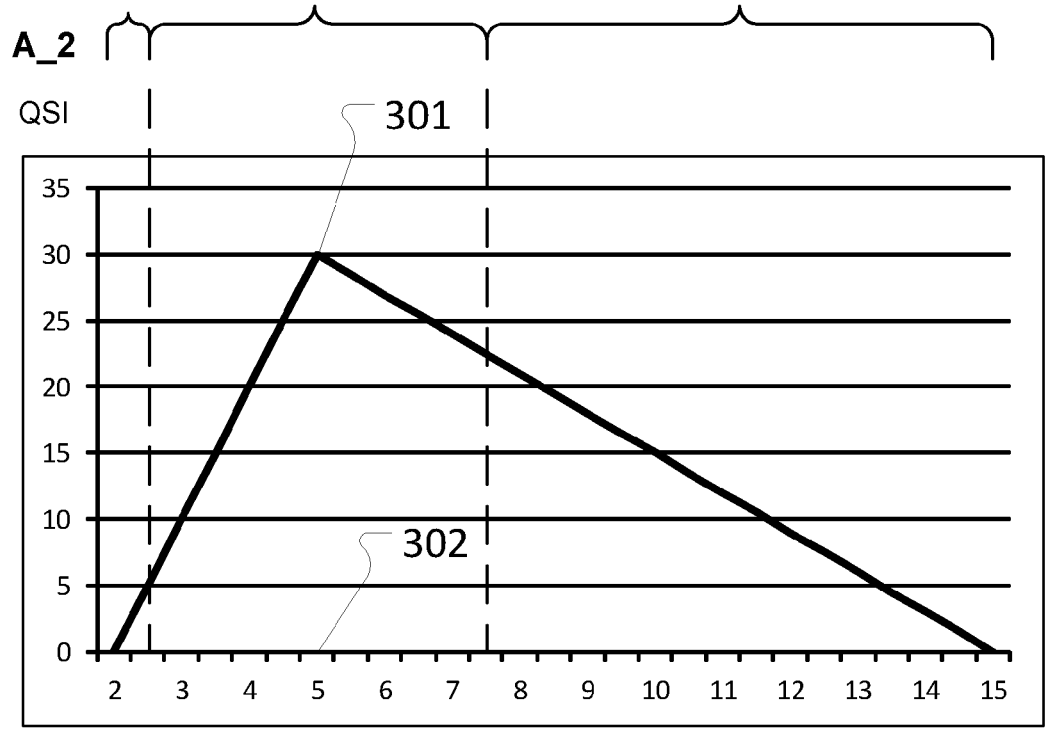

Some embodiments, and as further shown, include a number of ranges or bands with a first negative, a positive, and a second negative range or band (as used herein, the terms range and band are interchangeable). A QSI function can e.g. comprise only one negative range such as illustrated in FIG. 3b. In the particular example, the first negative range or band is for values [0, 10], [10, 30], and [30, 60]. It is typically not important whether a given end point of ranges next to each other belongs to one range or the other.

The positive range or band is in some embodiments determined to be the range of values around the OPT_VAL within a certain distance, e.g. +/−50%, [OPT_VAL−, 50*OPT_VAL; OPT_VAL+,50*OPT_VAL]. It is to be understood that other distances than 50% can be used and that the distance does not need to by symmetrical around OPT_VAL, e.g. it can be OPT_VAL−40%; OPT_VAL+ 55%.

The first negative range is then the range before or below the positive range while the second negative range is the range after or above the positive range.

Defining the positive range in relation to OPT_VAL is particularly advantageously if the positive quality impact values are normal or Gaussian distributed around or near the OPT_VAL.

Figure 4A:
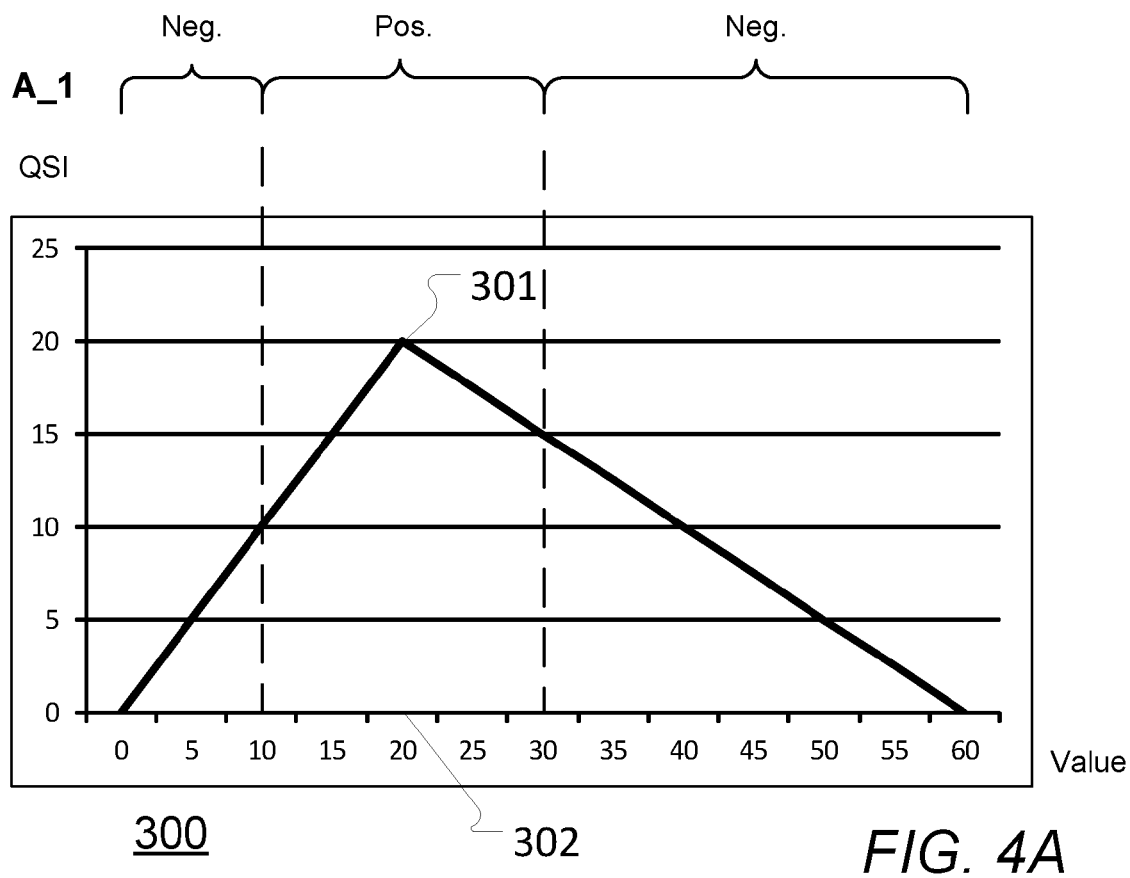
Figure 4B:
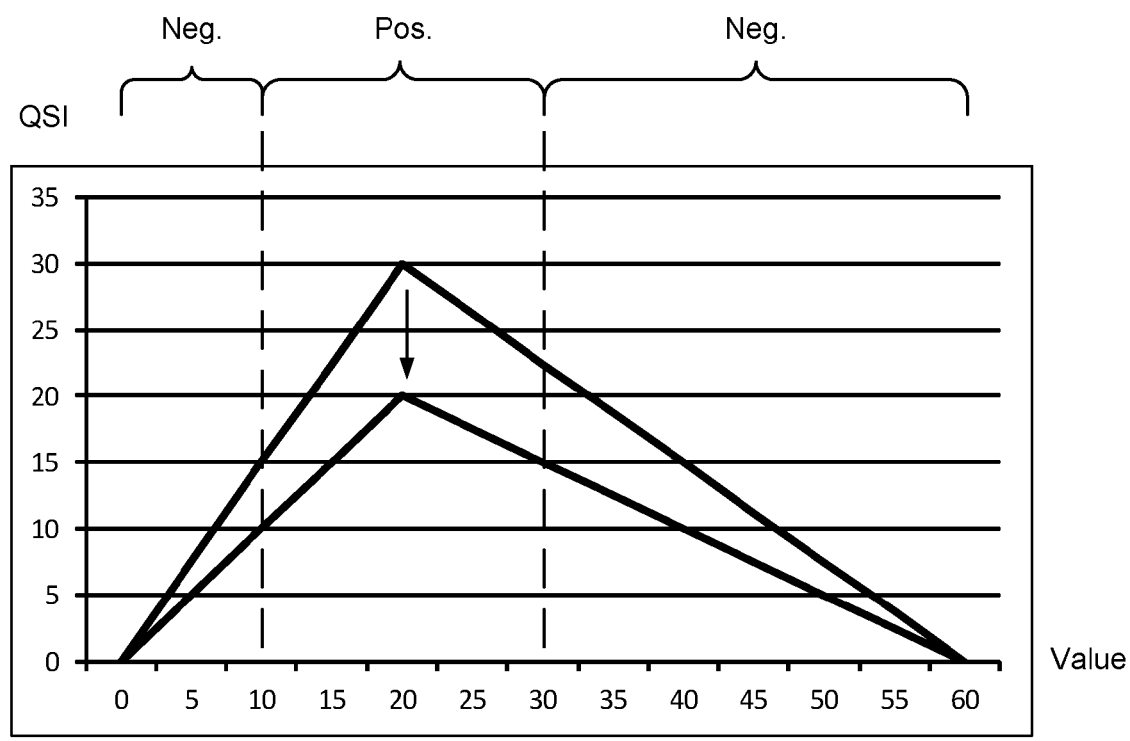
FIG. 4b shows both together more clearly illustrating the change or difference.
Figure 4C:
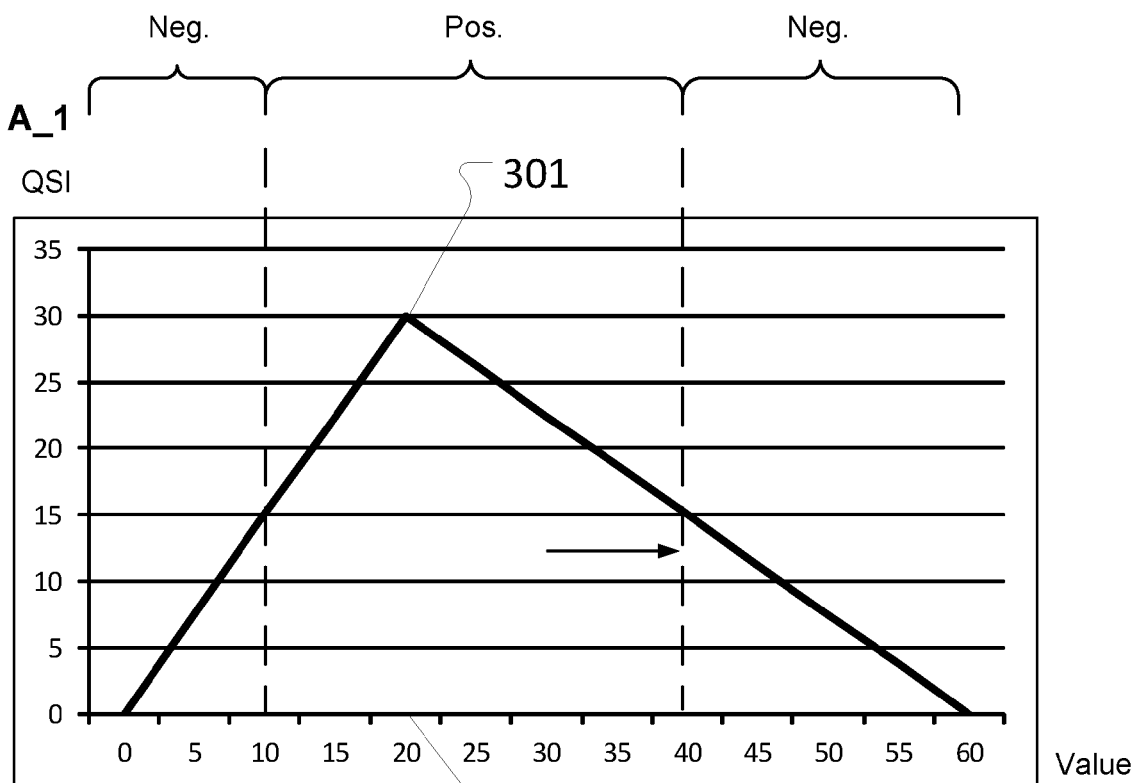
Figure 4D:
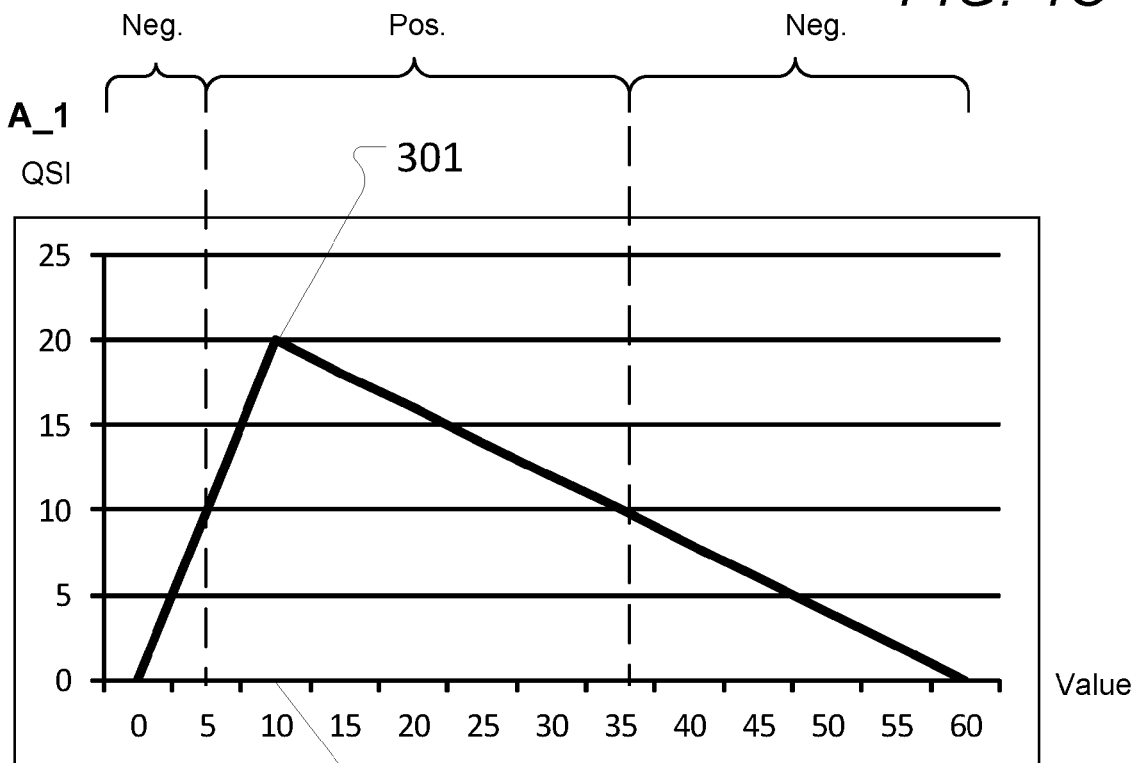

In alternative embodiments, the positive range is defined in relation to MAX_QSI, e.g. as illustrated in FIG. 4d. Here the positive range is defined to be the range that has values that are at least 50% of MAX_QSI (again another amount than 50% may be used).

Figure 5:
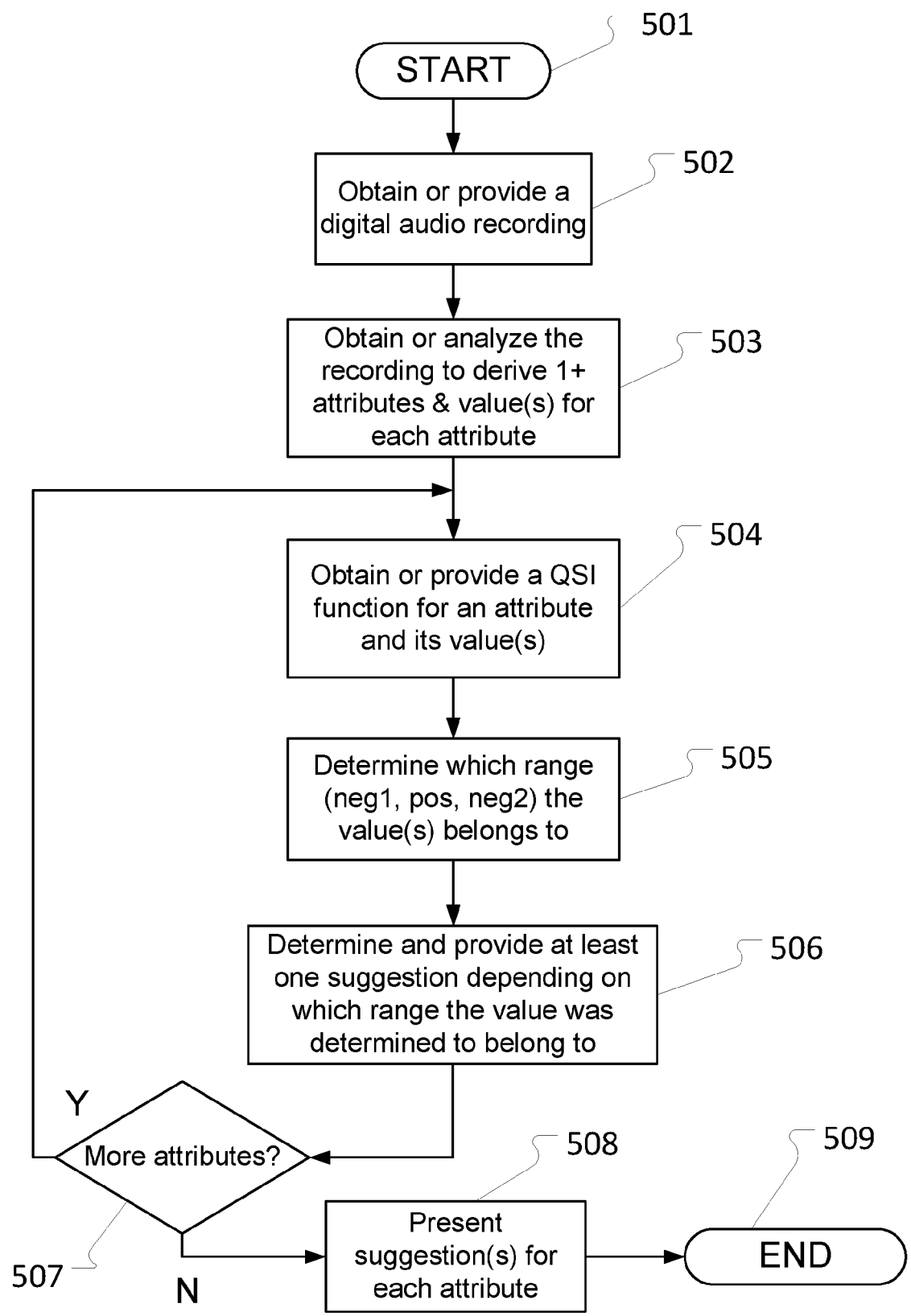
FIG. 5 schematically illustrates a flow chart of an embodiment of a computer-implemented method of deriving one or more quality improving or quality related suggestions for improving the content quality of a digital audio recording.

These ranges may be used by the quality improvement suggestion engine as explained further in relation to FIG. 5.

Values less than MIN or larger than MAX can be set to zero QSI.

In general and e.g. depending on specific use, the QSI functions can in some embodiments be discrete functions or in alternative embodiments be continuous functions. QSI functions can in some embodiments comprise negative QSI values, e.g. for very detrimental audio content quality. In some embodiments, The QSI function can e.g. also be zero for certain values. In some embodiments, only absolute values (i.e. difference/distance to MAX_QSI is used).

In some embodiments, a positive range could comprise a narrower positive (sub-)range, i.e. being closer around the OPT_VAL.

In some embodiments, a QSI function could comprise two (or more) separate positive ranges.

In general, the QSI functions can be implemented in many different ways e.g. depending on specific use and/or type of attributes. However, QSI functions such as the ones shown in FIGS. 3a-3d utilize very little computational and electronic storage resources to process and still enable useful results as disclosed throughout the present specification.

Shown in FIG. 3b is another exemplary QSI function 300 for another attribute (A_2) having a maximum QSI score (MAX_QSI) 301 of 30 at the optimal value (OPT_VAL) 302 being 5. In this particular example, MIN is 2, MAX is 15, first negative range [2, 2.5], positive range [2.5, 7.5], and second negative range [7.5, 15].

Figure 3C:
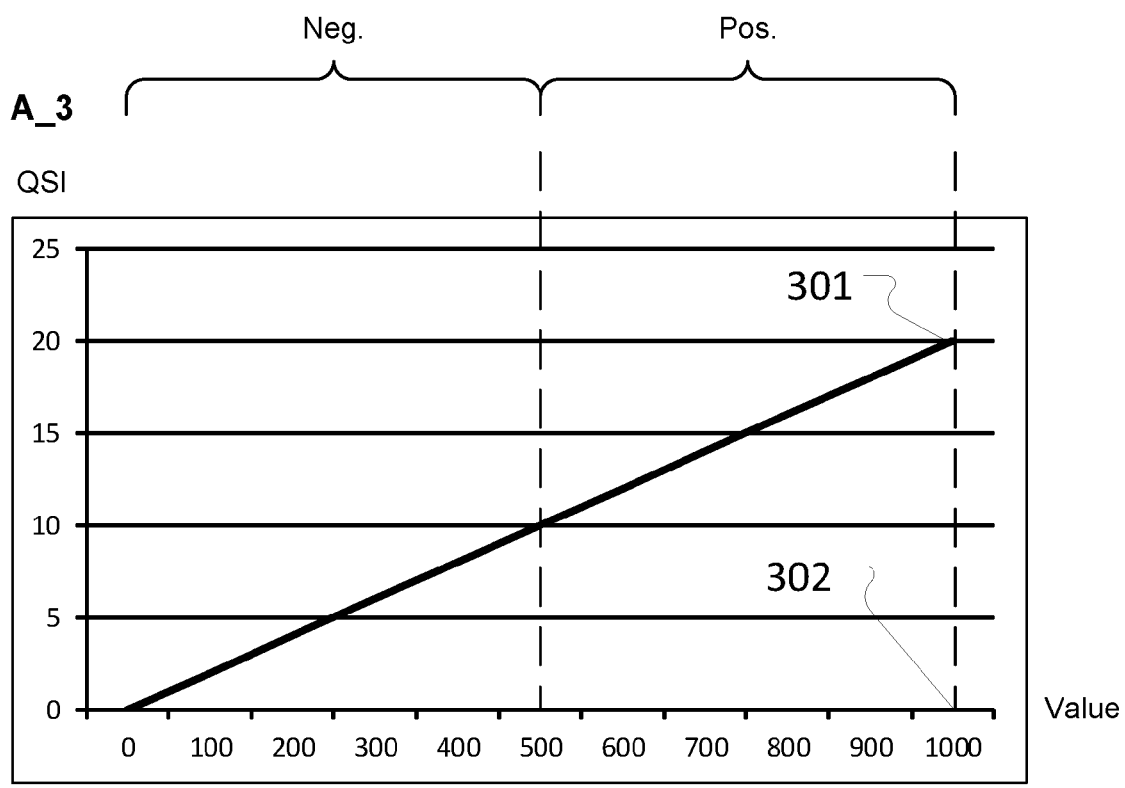

Shown in FIG. 3c is another exemplary QSI function 300 for another attribute (A_3) having a maximum QSI score (MAX_QSI) 301 of 20 at the optimal value (OPT_VAL) 302 being 1000. In this particular example, MIN is 0, MAX is 1000, first negative range [0, 500], and positive range [500, 1000]. Note that for this QSI function there is no second negative range.

Figure 3D:
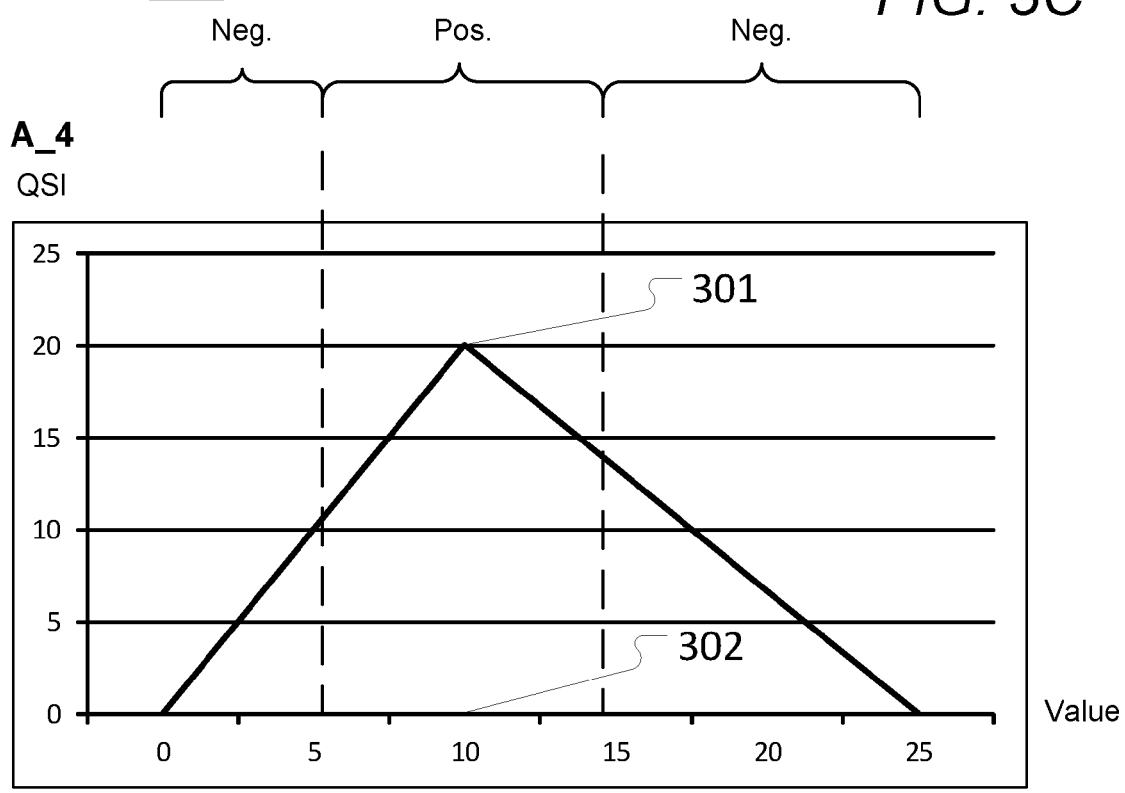

Shown in FIG. 3d is another exemplary QSI function 300 for another attribute (A_4) having a maximum QSI score (MAX_QSI) 301 of 20 at the optimal value (OPT_VAL) 302 being 10. In this particular example, MIN is 0, MAX is 25, first negative range [0, 5], positive range [5, 15], and second negative range [15, 25].

As mentioned, all the QSI functions 300 of FIGS. 3a-3d are already weighted in that the sum of their respective MAX_QSIs are 100 (30+30+20+20) signifying that the first two have been weighted by 30% each while the last two have been weighted by 20% each.

FIG. 4a schematically illustrates an alternative (or modified) quality score impact function of the quality score impact function of FIG. 3a while FIG. 4b shows both functions together more clearly illustrating the change or difference.

Shown in FIG. 4a is the QSI function of FIG. 3a with the change that it is now weighted by 20 or 20% (as can be seen by the MAX_QSI now being 20 instead of 30). As may be seen this does not change the negative and positive ranges but simply scales or weighs the QSI function to a different extent as illustrated in FIG. 4b by the arrow.

FIG. 4c schematically illustrates another alternative quality score impact function of the quality score impact function of FIG. 3a.

Illustrated in FIG. 4c is the QSI function of FIG. 3a with the change that the positive range (and thereby also the negative ranges) is different as now the positive range is defined in relation to MAX_QSI instead of OPT_VAL. Here the positive range is determined to be the range with values having QSI values being or being above 50% of MAX_QSI. An arrow indicates the difference to the QSI function of FIG. 3a. Please note, that in this particular case, the starting point of the positive range is not changed; only the ending point (and thereby also the starting point of the second negative range). Effectively, the positive range is increased compared to FIG. 3a and now is [10, 40] instead of [10, 40].

Changing the criteria from 50% of MAX_QSI will generally narrow the positive range by having larger percentages and will generally broaden the positive range by having smaller percentages.

FIG. 4d schematically illustrates yet another alternative quality score impact function of the quality score impact function of FIG. 3a (or FIG. 4a).

Here the QSI function has a QSI_MAX of 20, an OPT_VAL of 10 (instead of 20), same MIN and MAX, and the positive range is defined in relation to the QSI_MAX (instead of OPT_VAL).

As can be seen, in this particular example the first negative range [0, 5], positive range [5, 35], and second negative range [35, 60].

Figure 4E:
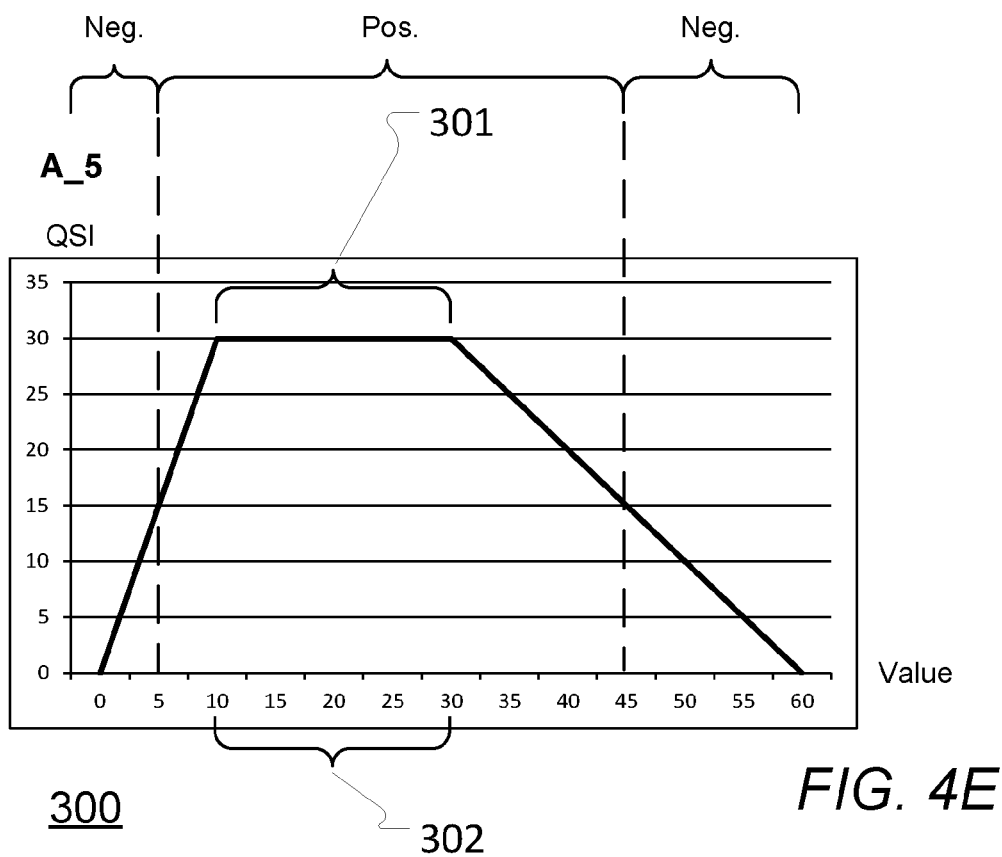
FIG. 4e schematically illustrates a further alternative quality score impact function of an attribute of a digital audio recording.

FIG. 4e schematically illustrates a further alternative quality score impact function of an attribute of a digital audio recording.

Shown in FIG. 4e is another exemplary QSI function 300 for another attribute (A_5) with MIN being 0, MAX being 60, first negative range [0, 5], positive range [5, 45], and second negative range [45, 60]—where the ranges are derived in relation to MAX_QSI—and a maximum QSI score (MAX_QSI) 301 of 30.

However, in this particular and corresponding examples, the maximum QSI score (MAX_QSI) 301 is provided for a range of optimal values (OPT_VAL) 302 being [10, 30] rather than for a single value. This provides a flat plateau of optimum values, signifying that all values of the range 302 is equally important in relation to the quality score of the particular attribute.

The ranges could alternatively be derived, as explained, on the basis of the optimal values or rather in this case, the range of the optimal values, e.g. +/−50% of the optimal value range by reducing the minimum optimal value (being 10 in this example) by 50% and increasing the maximum optimal value (being 30 in this example) actually giving the same negative and positive in this particular example but often providing different ranges.

Figure 4F:
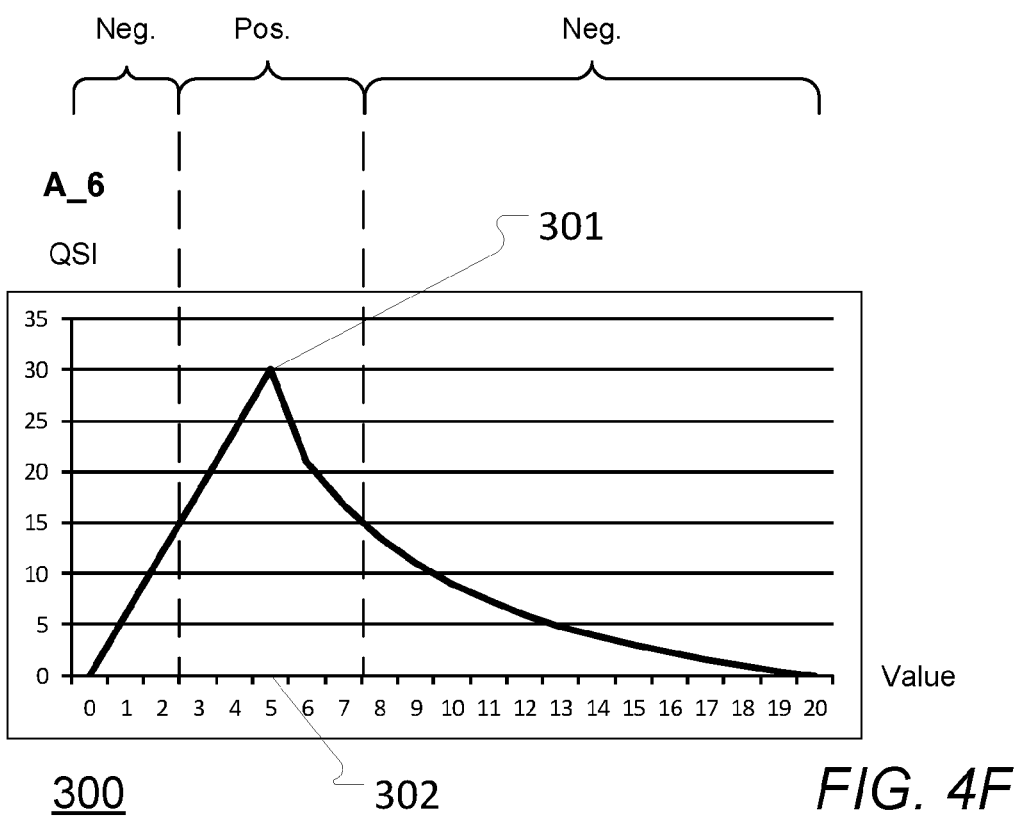
FIG. 4f schematically illustrates another alternative quality score impact function of an attribute of a digital audio recording.

FIG. 4f schematically illustrates another alternative quality score impact function of an attribute of a digital audio recording.

Shown in FIG. 4f is another exemplary QSI function 300 for another attribute (A_6) with MIN being 0, MAX being 20, first negative range being [0, 2.5], positive range being [2.5, 7.6], and second negative range [7.6, 20] (where the ranges are derived in relation to MAX_QSI), and a maximum QSI score (MAX_QSI) 301 of 30 at the optimal value (OPT_VAL) 302 being 5.

As can be seen, this QSI function 300 differs in that the function tapers away from the MAX_QSI value in a non-linear manner in the direction of increasing values, which decreases the quality score first quicker nearer the optimal value (OPT_VAL) and then more slowly further away from the optimal value (OPT_VAL) compared to a linearly decreasing function with the same MAX_QSI and MAX values.

It is to be understood that a QSI function could taper away on the 'other side' of the MAX_QSI value, either in addition or instead.

It should be understood that many different types of QSI functions or profiles could be used to effect. What is significant is that they represent the quality score impact appropriately as a function of the value(s).

FIG. 5 schematically illustrates a flow chart of an embodiment of a computer-implemented method of deriving one or more quality improving or quality related suggestions for improving the content quality of a digital audio recording.

Shown in FIG. 5 is a flowchart of an embodiment of a computer-implemented method 550 of deriving and providing one or more quality improving or quality related suggestions for improving the content quality of a digital audio recording, i.e. the functionality of a quality improvement suggestion engine, where the computer-implemented method is performed by an electronic data processing apparatus, e.g. or preferably such as the one illustrated in FIG. 8.

At step 501, the method starts and potentially is initialized, etc.

At step 502, a digital audio recording featuring one or more human voices is provided or obtained e.g. as explained in connection with step 102 of FIG. 1.

At step 503, one or more attributes and at least one associated value for each attribute of the digital audio recording is provided e.g. as explained in connection with step 103.

In the following, it is assumed that only one associated value for each attribute is provided and used, but it is to be understood that modifications may be made to accommodate two or more values.

At step 504, At step 201, an appropriate QSI function for a received attribute and its associated value(s) is obtained or provided e.g. as explained in connection with step 201 of FIG. 2.

Steps 501-503 correspond to steps 101-103 of FIG. 1 while step 504 corresponds to step 201 of FIG. 2.

At step 505, it is determined which of the first and second (if present) negative ranges and the positive range the value belongs within.

This can be determined by comparing the value to the ranges. The ranges may e.g. be determined as explained in connection with FIG. 3 or in any other suitable manner.

At step 506, at least one quality suggestion is provided for the particular attribute depending on which range the value belongs to where the suggestion is specific to the particular attribute (although one suggestion may be given for different attributes). I.e. if the value is within the first negative range (e.g. a value of 5 for FIG. 3a) one suggestion SUG_1 may be provided, if the value is within the positive range (e.g. a value of 15 for FIG. 3a) another suggestion SUG_2 may be provided, and finally if the value is within the second negative range (e.g. a value of 5 for FIG. 3a) another suggestion SUG_3 may be provided.

The suggestions are quality improving suggestions that, if implemented or followed, will cause a qualitative improvement of the content of another future digital audio recording (e.g. with the same configuration).

The suggestions can depend on what attribute the suggestion is associated with.

The suggestion(s) related to the first negative range may e.g. be a suggestion that will cause the value of a future digital audio recording to be closer to the OPT_VAL and/or at least to be within the positive range, i.e. the value should increase.

The suggestion related to the positive range may in some embodiments be to not change anything, or alternatively to change an attribute only a slightly.

The suggestion(s) related to the second negative range may e.g. be suggestion that will cause the value of a future digital audio recording to be closer to the OPT_VAL and/or at least to be within the positive range, i.e. the value should decrease.

Sometimes the suggestions related to the first and the second negative ranges may be the same.

In some embodiments, more than one suggestion may be given.

After at least one suggestion to improve the quality has been identified or determined for the particular attribute, step 507 checks whether suggestions should be determined for any more attributes.

If yes, the method loops back to step 504 that is carried out with the next attribute and its value(s).

If no, the method proceeds to step 508 where the identified quality improving suggestion(s), e.g. at least one for each attribute, is/are presented e.g. at one or more client devices and e.g. together with additional relevant information.

In some embodiments, step 508 does not present all determined suggestions, which may be a benefit e.g. for a digital audio recording having many attributes. As an example, the determined suggestions are analyzed to see the extent of the quality improving impact they each will have and then only the top 'X' (e.g. top 3, 5, 100, etc.) suggestions is presented.

It is to be noted that the ordering of some steps may be different, e.g. step 506 may e.g. be moved to after step 507 and before 508.

Figure 6:
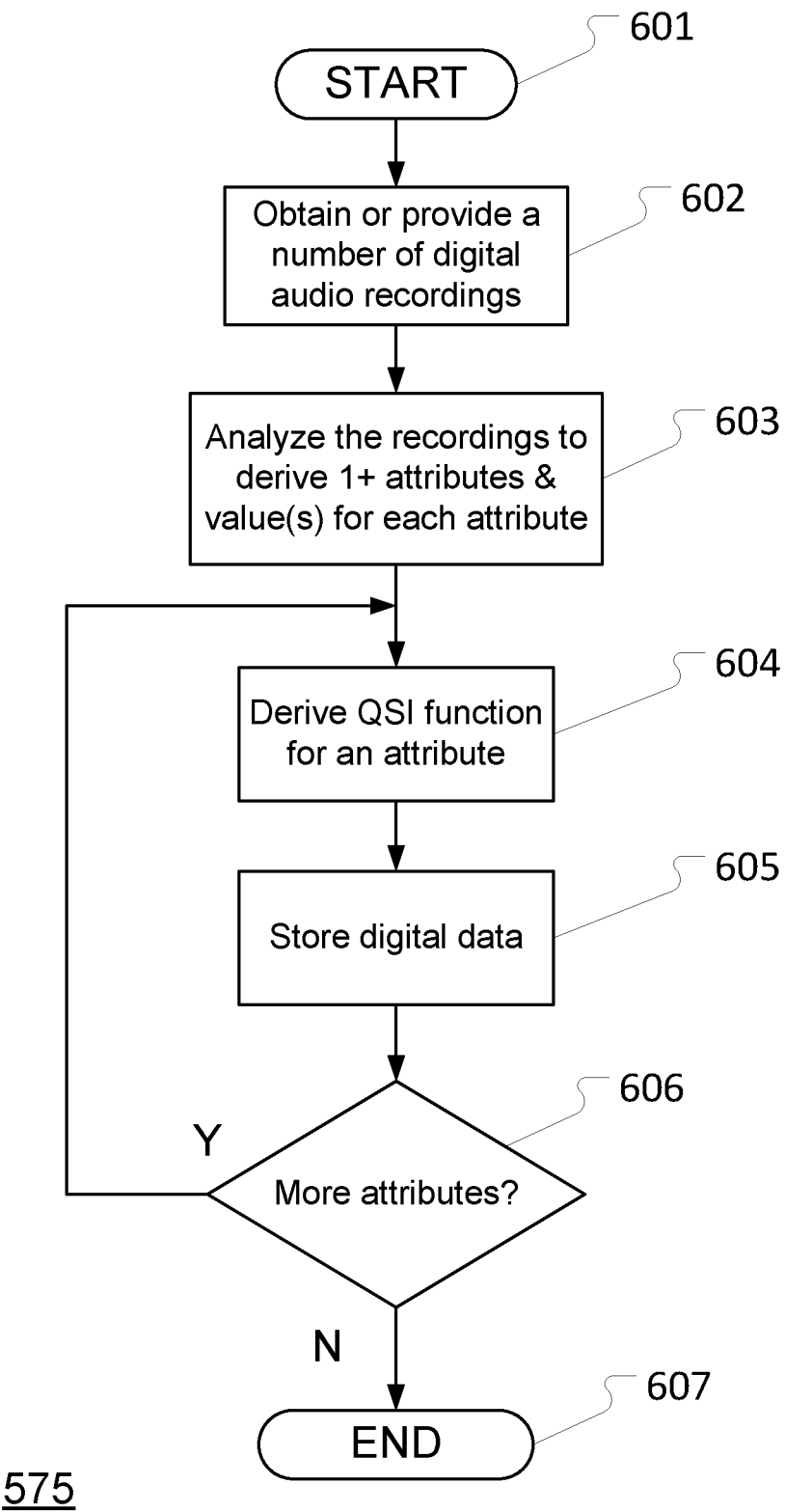
FIG. 6 schematically illustrates a flow chart of an embodiment of a computer-implemented method of generating one or more quality score impact functions for one or more digital audio recordings.

FIG. 6 schematically illustrates a flow chart of an embodiment of a computer-implemented method of generating one or more quality score impact functions for one or more digital audio recordings.

Shown in FIG. 6 is a flowchart of an embodiment of a computer-implemented method 575 of generating one or more quality score impact functions for one or more digital audio recordings where the computer-implemented method is performed by an electronic data processing apparatus, e.g. or preferably such as the one illustrated in FIG. 8.

At step 601, the method starts or is initialized.

At step 602, a number of digital audio recordings featuring one or more human voices is obtained or provided. Preferably, a quality score is obtained or provided as well, e.g. for each or some of the digital audio recording. If known, it/they may simply be provided. Alternatively, it/they may be obtained by appropriate analysis or estimation.

In some embodiments, the obtained or provided digital audio recordings are from a same configuration, or at least from similar configurations, as this can increase the quality of the analysis and thereby the quality of the QSI functions.

The number of obtained or provided digital audio recordings may vary according to availability and/or purpose but it could e.g. be as much as 100, 500, or even 1000 or more. The number should large enough to obtain a statistical sufficient foundation for deriving the QSI functions.

At step 603, the obtained or provided digital audio recordings are analyzed, e.g. using statistical analysis and the obtained or provided quality scores. Statistical correlation may e.g. be used to determine a correlation between the provided quality scores and possible attribute candidates. This enables statistical determination of one or more external (and/or internal) attributes that has an impact on the quality of the digital audio recordings within the given configuration(s). The attributes should be quantifiable, i.e. one or more values should exist quantifying the extent or level of the attribute. Step 603 also derives one or more of such values for each attribute.

At step 604, a QSI function is determined or generated for a respective attribute. This may be done in different appropriate ways. One way, is e.g. to derive a representative distribution or histogram of the value(s) of the respective attribute together with a representative MIN and MAX value (e.g. trimming or removing unwanted or noise values). The representative distribution or histogram can e.g. for further analysis purposes be replaced by a fitted idealized distribution. For some attributes and values, the distribution or histogram will often be normal or Gaussian distributed while other types of distributions can also be relevant. Using the provided quality scores it is possible to derive a maximal value of the QSI function (i.e. MAX_QSI or an estimate thereof) and from that and the distribution it is possible to determine the optimal value OPT_VAL or an estimate thereof.

From these values a piecewise linear function may e.g. be determined as the QSI function. As already mentioned, other functions may be used as a representation instead.

As mentioned, the QSI functions enables at least two things—one: to determine the quality score (and track that over time) for a digital audio recording (with the same configuration) and two: to provide suggestions based on where an actual value of an attribute is in relation to an optimal value (i.e. in which range). This can be enabled by only a single function.

Additionally, the QSI functions enable versatility of representation (and 'tweaking') of the quality impact for a particular attribute e.g. by changing values for a relatively few parameters such as MIN, MAX, OPT_VAL and/or MAX_QSI.

At step 605, the derived data is stored in a suitable data structure, e.g. as shown in FIG. 10, in one or more digital databases, memory structures, etc. Instead of storing the QSI function, the parameters defining it may be stored instead (or in addition). One or more suggestions for each range or band of each attribute can be stored in the database as well. To determine the suggestions it is possible to use the correlation(s) mentioned At step 606, it is checked whether a QSI function should be derived for further attributes. If yes, the method loops back to step 604 to derive a QSI function for the next attribute. If no, the method proceeds to step 607 where it ends.

The method of generating one or more quality score impact functions 575 may optionally take one or more additional obtained or provided parameters into account, e.g. at step 603 and/or 604. The additional parameters may e.g. include 'more subjective parameters. The additional parameters may e.g. also be used in determining the suggestions.

Figure 7:
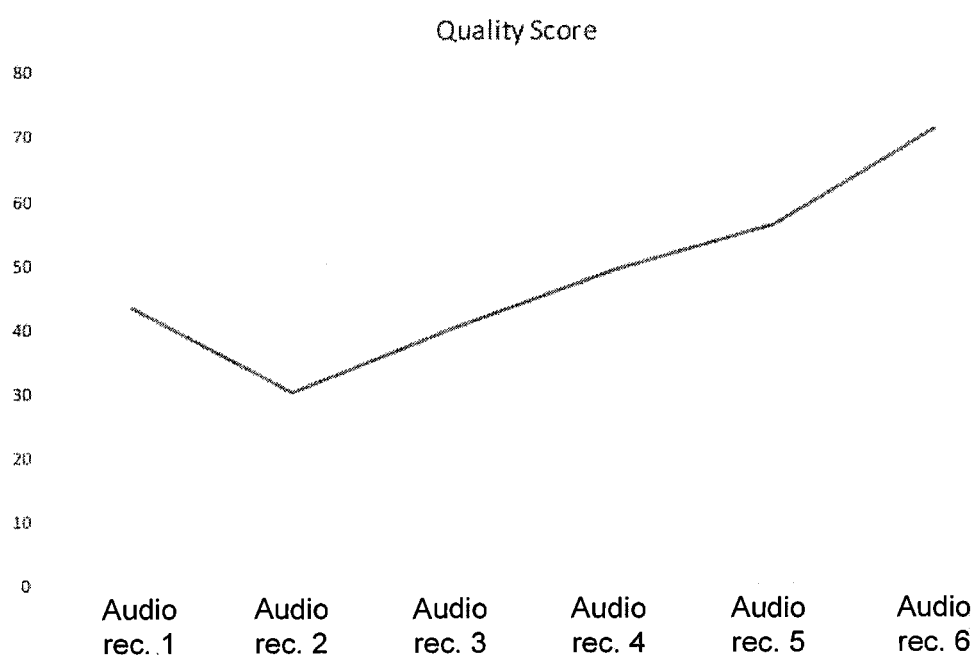
FIG. 7 schematically illustrates an exemplary tracking over time of actually derived quality scores for one digital audio recording.

FIG. 7 schematically illustrates an exemplary tracking over time of actually derived quality scores for one digital audio recording.

Shown in FIG. 7 are a number of actually derived quality scores obtained over time as obtained by the method of FIG. 1 with the QSI functions of FIGS. 3a-3d for consecutive digital audio recordings with a same configuration. As can be seen, the quality improves over time by having implemented suggestions, as provided.

For the digital audio recording Audio rec. 2 the suggestion was not followed, leading to a decrease in its quality score.

FIG. 8 schematically illustrates a functional block diagram of embodiments of an electronic data processing apparatus comprising a quality suggestion engine and/or implementing various embodiments of the methods mentioned throughout the specification.

Shown is an electronic data processing apparatus 400 comprising one or more processing units 802 connected via one or more communications and/or data buses 801 to an electronic memory and/or electronic storage 803, one or more signal transmitter and receiver communications elements 804 (e.g. one or more of cellular, Bluetooth, WiFi, etc.) for communicating via a computer network, the Internet, and/or the like, a display 808, and one or more (e.g. graphical and/or physical) user interface elements 807.

The electronic data processing apparatus 400 can e.g. be a programmed computational device, e.g. like a PC, laptop, computer, server, smart-phone, tablet, etc. and is specially programmed to carry out or execute the computer-implemented method(s) and embodiments thereof as described throughout the specification and variations thereof.

Figure 9:
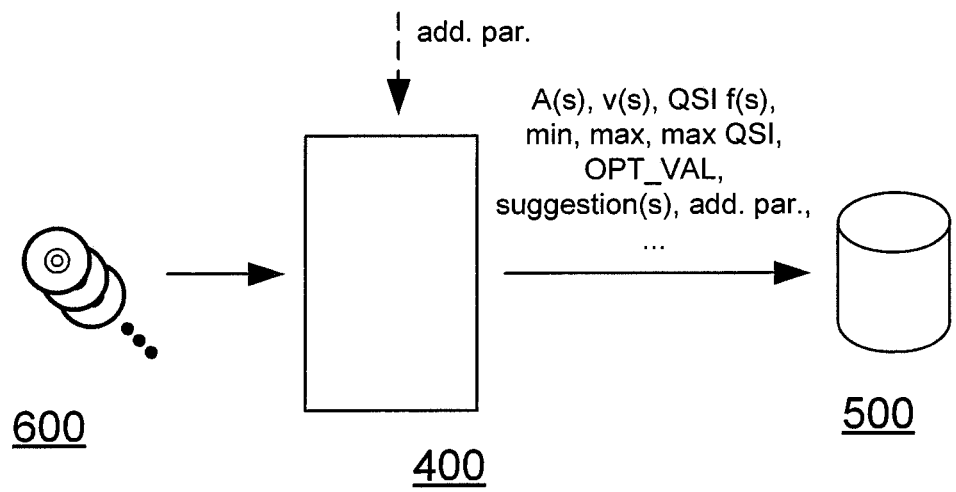
FIG. 9 schematically illustrates an embodiment of a system, e.g. comprising the electronic data processing apparatus of FIG. 8, adapted to obtain and/or derive one or more attributes, values, quality score impact function, etc. on the basis of one or more obtained or provided digital audio recordings.

FIG. 9 schematically illustrates a functional block diagram of an embodiment of a system, e.g. comprising the electronic data processing apparatus of FIG. 8, adapted to obtain and/or derive one or more attributes, values, quality score impact function, etc. on the basis of one or more obtained or provided digital audio recordings.

Illustrated is an electronic data processing apparatus 400 receiving a number of digital audio recordings 600 and optionally one or more additional parameters. The electronic data processing apparatus 400 may execute a computer-implemented method of generating one or more quality score impact functions for one or more digital audio recordings, e.g. the one shown and explained in connection with FIG. 6, to derive relevant data (such as attributes, values, QSI functions and/or their representations (MIN, MAX, MAX_QSI, OPT_VAL) that can be stored (locally and/or remotely) in an electronic database 500.

FIG. 10 schematically illustrates an embodiment of a data structure.

Illustrated is one exemplary data structure 800 for storing relevant data e.g. as obtained by the method of FIG. 6 or embodiments thereof. The data structure comprises a number of configurations (Conf.) and a number of attributes (A) for each configuration. For each attribute (of each configuration) a related QSI function (QSI_f(v) where v signify that it is a function of an attribute or quality value), or a representation thereof as explained earlier, is stored as well as a number (n) of suggestions (SUG(A,n)) for the particular attribute together with an indication of what suggestion(s) are applicable for each range or band of the QSI function for the particular attribute.

The number of suggestions may be different for each attribute. Suggestion SUG.A_1 e.g. comprises three suggestions while SUG.A_3 comprises two suggestions.

An attribute (e.g. as A_1 in the shown example) may be an attribute of two or more configurations. In principle, although not shown in this particular example, a QSI function for a given attribute could e.g. be different for different configurations.

The data of the data structure 800 may e.g. be used by the method of FIGS. 1, 2 and/or 5 or respective embodiments thereof.

Some preferred embodiments have been shown in the foregoing, but it should be stressed that the invention is not limited to these, but may be embodied in other ways within the subject matter defined in the following claims.

In the claims enumerating several features, some or all of these features may be embodied by one and the same element, component or item. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A computer-implemented method performed by an electronic data processing apparatus to implement a suggestion engine, comprising:
   configuring a variable, which is independent from an attribute associated with content of a digital audio recording captured by a microphone and featuring one or more human voices, using a processor, by:
   defining a quality score impact function characterizing a plurality of weight values having a maximum and tapering away in one or two respective bands adjacent to the maximum to produce a range of weight values, and
   defining a scale setting a minimum and a maximum range of values for the variable corresponding to the range of weight values;
   calculating, by the processor, an impact on a quality score of one of the values for the variable according to the quality score impact function to produce an impact value;
   adjusting, by the processor, the quality score based on the calculated impact value to cause a qualitative improvement in a content of a further digital audio recording, wherein the weight values in the one or two respective bands have a negative impact on the quality score, whereas weight values outside the respective bands have a positive impact on the quality score;
   causing a representation of the adjusted quality score to be displayed on an electronic display device of a client device;
   determining from the adjusted quality score a suggestion for adjusting the attribute to produce a qualitative improvement in the content of the further digital audio recording;
   causing the suggestion to be displayed on the electronic display of the client device;
   causing an adjustment to the attribute associated with content of the further digital audio recording according to an extent indicated at least by the adjusted quality score; and
   storing, by the electronic data processing apparatus, the further digital audio recording, wherein the further digital audio recording has a smaller file size compared to the digital audio recording, and wherein the further digital audio recording produces a higher quality score compared to the adjusted quality score in response to carrying out the suggestion.

2. The method of claim 1, wherein the attribute associated with the content of the digital audio recording includes a duration of the recording, a tone or mood of one or more of the one or more human voices featured in the recording, one or more predetermined words or phrases uttered by one or more of the one or more human voices featured in the recording, a number or duration of pauses in the recording where no human voice is speaking, a number or duration of talk-over occurrences in which multiple ones of the one or more human voices are speaking simultaneously in the recording, a number of human voices featured in the recording, or a type or role of each human associated with the one or more human voices featured in the recording.

3. The method of claim 1, wherein the variable includes an amount of time associated with preparing the recording independent of a duration of the recording.

4. The method of claim 1, wherein the quality score impact function includes a linear function segment to characterize at least part of one of the bands that tapers away from the maximum.

5. The method of claim 1, wherein the quality score impact function includes a non-linear function segment to characterize at least part of one of the bands that tapers away from the maximum.

6. The method of claim 1, further comprising applying a weight or a weight function to the calculated impact value, wherein the weight function defines different weights for different impact values.

7. The method of claim 1, further comprising:
   configuring a second variable, which is related to an attribute associated with the content of the digital audio recording by:
   defining a second quality score impact function characterizing a second plurality of weight values having a maximum and tapering away in one or two respective bands adjacent to the maximum to produce a second range of weight values, and
   defining a second scale setting a minimum and a maximum range of values for the second variable corresponding to the range of weight values;
   calculating an impact on the quality score of one of the values for the second variable according to the second quality score impact function to produce a second impact value;
   adjusting the quality score based on the calculated second impact value to cause a further qualitative improvement in the content of a further digital audio recording, wherein the weight values in the one or two respective bands have a negative impact on the quality score, whereas weight values outside the one or two respective bands have a positive impact on the quality score, wherein the quality score impact function is different from the second quality score impact function, and wherein the scale and the second scale have different minima and maxima.

8. The method of claim 1, wherein the suggestion is based on the calculated impact value such that responsive to the calculated impact value having a negative impact on the quality score, the suggestion indicates an enhancement to the attribute to produce an increase in the quality score in the further digital audio recording.

9. The method of claim 8, further comprising:
   receiving an input from an electronic human-machine interface device indicating an adjustment to the attribute associated with content of the further digital audio recording according to the suggestion; and
   storing the further digital audio recording, wherein the further digital audio recording has a higher quality score compared to the adjusted quality score associated with the digital audio recording.

10. The method of claim 1, further comprising automatically transcribing the content of the digital audio recording into corresponding machine-and-human-readable text.

11. The method of claim 1, further comprising:
- configuring a second variable that includes an attribute associated with the content of the digital audio recording;
- defining a second quality score impact function characterizing a plurality of weight values having a maximum and tapering away in one or two respective bands adjacent to the maximum to produce a range of second weight values;
- defining a second scale setting a minimum and a maximum of values for the second variable corresponding to the range of second weight values;
- calculating an impact on a quality score of one of the values for the second variable according to the second quality score impact function to produce a second impact value; and
- adjusting the quality score based on the calculated second impact value to cause a further qualitative improvement in the content of the further digital audio recording.

12. The method of claim 11, wherein the attribute associated with the content of the digital audio recording includes a duration of the recording, a tone or mood of one or more of the one or more human voices featured in the recording, one or more predetermined words or phrases uttered by one or more of the one or more human voices featured in the recording, a number or duration of pauses in the recording where no human voice is speaking, a number or duration of talk-over occurrences in which multiple ones of the one or more human voices are speaking simultaneously in the recording, a number of human voices featured in the recording, or a type or role of each human associated with the one or more human voices featured in the recording.

13. The method of claim 1, wherein the maximum of the weight values is a plurality of maxima in the range of weight values.

* * * * *